United States Patent
Lachev

(10) Patent No.: US 12,039,298 B2
(45) Date of Patent: Jul. 16, 2024

(54) METHOD FOR CONFIGURING MODEL COMPONENTS OF A SYSTEM MODEL

(71) Applicant: dSPACE GmbH, Paderborn (DE)

(72) Inventor: Lazar Lachev, Paderborn (DE)

(73) Assignee: dSPACE GMBH, Paderborn (DE)

( * ) Notice: Subject to any disclaimer, the term of this patent is extended or adjusted under 35 U.S.C. 154(b) by 0 days.

(21) Appl. No.: 18/074,802

(22) Filed: Dec. 5, 2022

(65) Prior Publication Data

US 2024/0184538 A1 Jun. 6, 2024

(51) Int. Cl.
*G06F 8/34* (2018.01)
*G06F 9/54* (2006.01)

(52) U.S. Cl.
CPC ............. *G06F 8/34* (2013.01); *G06F 9/541* (2013.01)

(58) Field of Classification Search
CPC ................... G06F 8/34; G06F 9/541
See application file for complete search history.

(56) References Cited

U.S. PATENT DOCUMENTS

| | | | | |
|---|---|---|---|---|
| 7,466,710 B1* | 12/2008 | Clemm | ............... | H04M 7/1245 370/410 |
| 10,417,355 B1* | 9/2019 | Torgerson | ............... | G06F 8/34 |
| 10,755,001 B2* | 8/2020 | Shakeri | ............... | G06F 8/10 |
| 2002/0035463 A1* | 3/2002 | Lynch | ............... | G06F 30/15 703/21 |
| 2003/0013492 A1* | 1/2003 | Bokhari | ............... | G06F 3/0481 455/566 |
| 2012/0030650 A1* | 2/2012 | Ravindran | ............... | G06F 8/20 717/107 |
| 2014/0040855 A1* | 2/2014 | Wang | ............... | G06F 8/34 717/107 |
| 2015/0058772 A1* | 2/2015 | Bator | ............... | G06T 11/206 715/769 |
| 2017/0098154 A1* | 4/2017 | Glendenning | ...... | G06F 16/9024 |

(Continued)

FOREIGN PATENT DOCUMENTS

| | | | | |
|---|---|---|---|---|
| CN | 1601510 A | * | 3/2005 | ............... G06F 8/20 |
| CN | 105659221 A | * | 6/2016 | ............. G06F 3/048 |

(Continued)

OTHER PUBLICATIONS

"Hide container when post list is empty", published on Aug. 2, 2018 to https://wpshowposts.com/support/topic/hide-container-when-post-list-is-empty, retrieved Jun. 9, 2023. (Year: 2018).*

(Continued)

*Primary Examiner* — Shourjo Dasgupta
(74) *Attorney, Agent, or Firm* — Muncy, Geissler, Olds & Lowe, P.C.

(57) ABSTRACT

A method for configuring model components of a system model in a model-based test environment, wherein the test environment comprises a model editor, wherein the test environment is executed on a computer system having a processor and a display, and wherein the model components have a plurality of ports, comprising the following steps: S1) Loading the system model into the model editor, S2) receiving a user selection for at least a first port comprising a graphical port identifier, S3) assigning the selected graphical port identifier to a list, S4) displaying the list in the test environment, S5) receiving a user selection for the first port identifier from the list, S6) receiving a user selection for a second port, S7) connecting the first port to the second port by a signal connection.

8 Claims, 3 Drawing Sheets

(56) References Cited

U.S. PATENT DOCUMENTS

| | | | | |
|---|---|---|---|---|
| 2017/0154137 | A1* | 6/2017 | Shakeri | G06F 30/18 |
| 2018/0088911 | A1* | 3/2018 | Moors | G06F 8/71 |
| 2020/0034120 | A1* | 1/2020 | Hoff | G06F 9/44 |
| 2021/0089280 | A1* | 3/2021 | Moors | G06F 8/35 |
| 2021/0096830 | A1* | 4/2021 | Mair | G06F 9/3836 |

FOREIGN PATENT DOCUMENTS

| | | | | |
|---|---|---|---|---|
| DE | 102016119066 A1 * | 4/2017 | | G05B 19/418 |
| EP | 1895376 A2 * | 3/2008 | | G05B 15/02 |
| JP | H10134089 A * | 5/1998 | | |
| JP | 2005327192 A * | 11/2005 | | |
| JP | 2016517191 A * | 9/2016 | | |
| WO | WO-9915945 A2 * | 4/1999 | | G06T 17/00 |

OTHER PUBLICATIONS

"Chapter 8—Simulink Tutorial", published on Nov. 2, 2008 to https://ewh.ieee.org/r1/ct/sps/PDF/MATLAB/chapter8.pdf, retrieved Mar. 5, 2024. (Year: 2008).*

MathWorks, "Mask Editor Overview", published on Mar. 3, 2012 to https://www.mathworks.com/help/simulink/gui/mask-editor-overview.html, retrieved Mar. 5, 2024. (Year: 2012).*

MathWorks, "Building and Simulating a Simple Simulink Model", published on Oct. 23, 2017 to https://www.mathworks.com/videos/getting-started-with-simulink-part-1-building-and-simulating-a-simple-simulink-model-1508442030520.html, retrieved Mar. 5, 2024. (Year: 2017).*

KTH, "Getting started with Simulink", published on Sep. 10, 2010 to https://www.kth.se/social/upload/187/1.43412!SimulinkTutorial.pdf, retrieved Mar. 5, 2024. (Year: 2010).*

Anonymous, "System and Method of Discovering Same or Similar Constant Variable in Application Development Environment", published at IP.com as IPCOM000201138D on Nov. 9, 2010, retrieved Mar. 5, 2024. (Year: 2010).*

Software Engineering Stack Exchange, "ide—Why do you have to manually type variable names while debugging?", published Apr. 5, 2012 at https://softwareengineering.stackexchange.com/questions/143181/why-do-you-have-to-manually-type-variable-names-while-debugging, retrieved Mar. 5, 2024. (Year: 2012).*

* cited by examiner

METHOD FOR CONFIGURING MODEL COMPONENTS OF A SYSTEM MODEL

BACKGROUND OF THE INVENTION

Field of the Invention

The present invention relates to methods and computer systems for managing and visualizing block diagrams defining models of technical systems.

Description of the Background Art

The present invention is concentrated on the development of control devices, such as they are used in the automotive or aerospace industries for controlling technical systems, such as motors or brakes. In particular, the present invention relates to test systems used in the development process of control units.

The development of control units has become a highly complex process. In particular, new control units or new control functions should be tested as early as possible in the development process to review their overall functionality and to specify the further direction of development. Towards the end of the development process, it is important to test the already well-developed control unit as comprehensively as possible in order to carry out necessary modifications based on the test results before the control unit is launched or is series-produced, so that it functions as desired under all circumstances in later operation.

Electronic control units are especially indispensable in automotive applications. As such, ECUs may contain a processor or a microcontroller, one or more sensor interfaces and circuits to control actuators. Their processor will implement a control strategy to control a physical process by measuring current parameters of the control process and instruct the actuator circuits to influence the process in the desired way. Major development effort will have to be invested into the design of individual control strategy or strategies implemented on the ECU. Modern automotive applications call for increasingly complex control algorithms. In order to manage the increased complexity, software frameworks such as AUTOSAR have been defined for the development of ECU software, where prior to implementing the actual control strategy, an architecture of the software is specified. The architecture may comprise software components, subcomponents, model components and interfaces to these components.

Additional milestones in the development of ECUs lie in the test of the control strategies or function during early stages of development, as well as testing of the finished hardware ECU. Towards the end of the development process, it is important to test the already well-developed control unit as comprehensively as possible in order to carry out necessary modifications based on the test results before the control unit is launched or is series-produced, so that it functions as desired under all circumstances in later operation.

For the testing of control units, the methods hardware-in-the-loop simulation (HIL simulation) and rapid control prototyping (RCP) are known. In HIL simulation, an ECU is connected to a test system (HIL simulator), on which, for example, a software model of the system or process to be controlled by the ECU is executed. The software model is also referred to as an environment model. The test system thereby simulates the physical environment of the later application for the control unit. With RCP, on the other hand, a software model of a control unit to be developed or improved is executed on the test system. In the case of RCP, a technical system externally connected to the test system is regulated or controlled via the test system by means of the model executed on the test system.

Common to the overall development process, from definition of a software architecture to the HIL test of the finalized ECU, are block-diagram-based modeling techniques based on behavior models. To that end, modeling tools comprising a technical computing environment (TCE) allowing for execution and analyzation of the temporal behavior of the models are employed.

To configure test systems such as HIL or RCP systems, often configuration systems are used, which may also contain, for example, configuration diagrams. The configuration adjusts the test system such that software models of technical systems can be executed on the test system and communicate electronically via the input/output interface of the test system with devices (systems under test) connected to the test system. The software models are created in dedicated modeling environments that are specifically tailored to the modeling requirements.

The system models to be configured often have a high number of model components, which in turn come with high numbers of ports. A configuration system that has a large number of components and ports is known, for example, from U.S. Pat. No. 7,877,153, which is incorporated herein by reference. Configuring model components of such high complexity can be challenging. For example, the connection of two ports may be difficult if, due to the complexity of the system model, the ports are not visible at the same time.

SUMMARY OF THE INVENTION

It is therefore an object of the present invention to provide a method to configure model components of a system model in a model-based test environment, wherein the test environment comprises a model editor, wherein the test environment is executed on a computer system having a processor and a display, and wherein the model components have a plurality of ports, comprising the steps: S1) Loading the system model into the model editor, S2) receiving a user selection for at least a first port comprising a graphical port identifier, S3) assigning the selected graphical port identifier to a list, S4) displaying the list in the test environment, S5) receiving a user selection for the first port identifier from the list, S6) receiving a user selection for a second port, S7) connecting the first port to the second port by a signal connection.

The system model may represent a dynamic system, which can be either natural or man-made. Examples are environmental models for sensor stimulation, or models of partial or complete automobiles, airplanes, satellites, and many others. The system model can range from very simple to very complex.

The system model may be configured and/or edited and/or created in a test environment which is essentially a technical computing environment (TCE). The system model may be created in or loaded into the test environment. The model components may at least partially be interconnected by user input to create the system model. The test environment comprises a model editor which allows for creating and/or loading the model components, arranging, and rearranging them, and interconnecting the model components.

User input may be received to the test environment, i.e., the technical computing environment, by any suitable devices such as, but not limited to, a mouse, a stylus, a track pad, or any keyboard device.

Model components in the system model may be displayed using a display device. The model components may be represented by blocks in a block diagram, or entries in a drop-down menu, or any icons or the like in a graphical diagram. Inputs and outputs to and from the model components may be represented by ports, which may be interconnectable. Each interconnectable port may comprise a graphical identifier.

Interconnections between model components may be initiated by the user by interconnecting the ports by a line or wire, wherein each line or wire represents a signal or dataflow. Interconnection of two ports may be performed by dragging the graphical identifier or a first onto the graphical identifier of a second port.

In case of larger system models or block diagrams, the two graphical identifiers to be interconnected may not be accessible by the user. The user may then add the first graphical identifier to a list to store the identity of the port or graphical identifier for later use. The list can be understood as a temporary storage location for the port and its location in the system model hierarchy. The user may then navigate to the second model component or port to connect the first port to and select the stored port or graphical identifier from the list. By user interaction the two ports can be connected.

Model components may be present as blocks in a block diagram. The system model comprising model components can be represented by interconnected blocks which make up an executable block diagram. Blocks can be of various classes, such as calculation blocks, and time-based blocks.

Model components may be given by at least one of calculation blocks, bus blocks, requirements documents, or software architecture building blocks. In this embodiment, other classes of blocks can be used to perform computations on specific computational hardware, for example computers, micro-processors, hardware-programmable logic devices, or any custom hardware. Common characteristics to various forms of blocks and block diagrams is the definition of a semantic of the execution of the block diagram.

Receiving a user selection for the first graphical port identifier from the list and receiving a user selection for a second port can be performed by dragging and dropping the listed graphical port identifier onto the second port and vice versa.

The list can be permanently displayed as long as there are entries on it.

The list can disappear or become at least partially transparent as soon as there are no more entries on it.

The list can also appear or be displayed non-transparently as soon as a user selection according to step S2 is made.

A computer system is also provided, comprising at least one host computer, the host computer comprising a processor, a random-access memory, at graphics controller connected to a display, a serial interface connected to at least one human interface device, a nonvolatile memory, the nonvolatile memory comprising instructions that, when executed by the processor, cause the host computer to carry out the inventive method.

The processor may be replaced or complemented by a programmable logic device, such as a field programmable gate array, which is configured to provide a defined set of operations and/or may comprise an IP core microprocessor.

A non-transitory computer-readable medium is provided containing instructions that, when executed by a processor of a computer system, cause the computer to carry out the method according to the invention.

Further scope of the present invention is described below in the detailed description. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
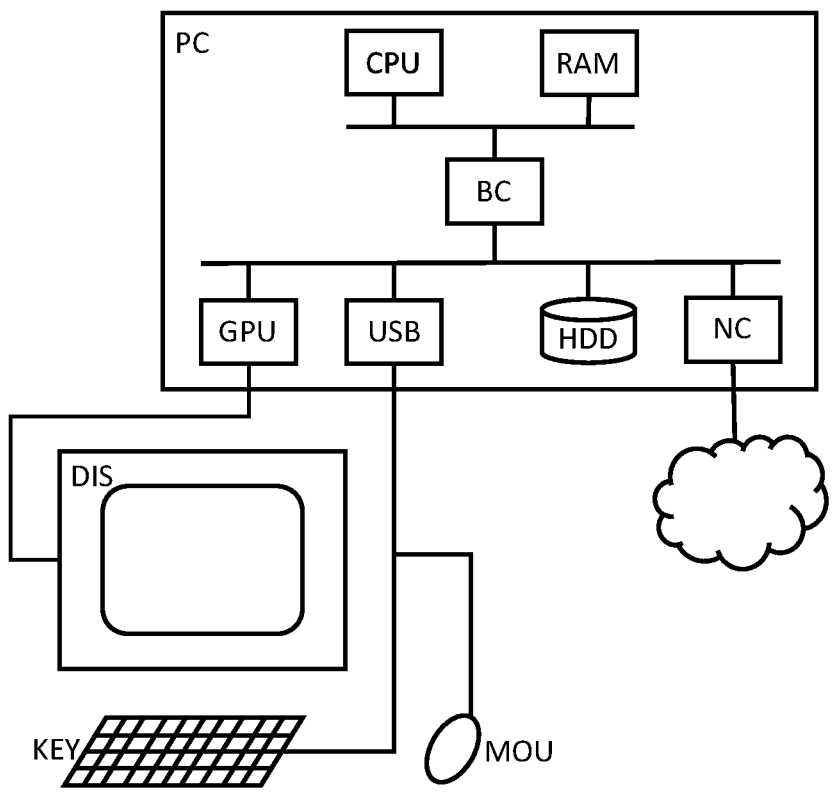
FIG. 1 is an exemplary diagram of a computer system.

In the illustration of FIG. 1, a computer PC with a display device DIS and HMI devices such as a keyboard KEY and a mouse MAU are shown. A configuration system for configuring a test system suitable for testing an electronic control unit can comprise such a computer in one embodiment.

The computer PC comprises at least one electronic processing unit CPU with one or more cores, a random access memory RAM and several peripheral devices connected to a local bus system, e.g., PCI Express, which exchanges data with the CPU unit by means of a bus control unit BC. The peripheral devices include, for example, a graphics card GPU, a bus control unit USB for connecting other peripheral devices, a non-volatile main memory HDD, for example, a hard disk or a semiconductor hard disk, and a network interface NC. In one embodiment, instructions are stored in the non-volatile main memory by means of which the computer carries out a method according to one or more of the claimed embodiments by means of an electronic processing unit.

The computer can comprise one or more servers, which include one or more processing units. The servers are then connected via a network to a client computer, which comprises a display device. The configuration system can then be completely or partially executed on a remote server, such as on a cloud computing system.

Figure 2:
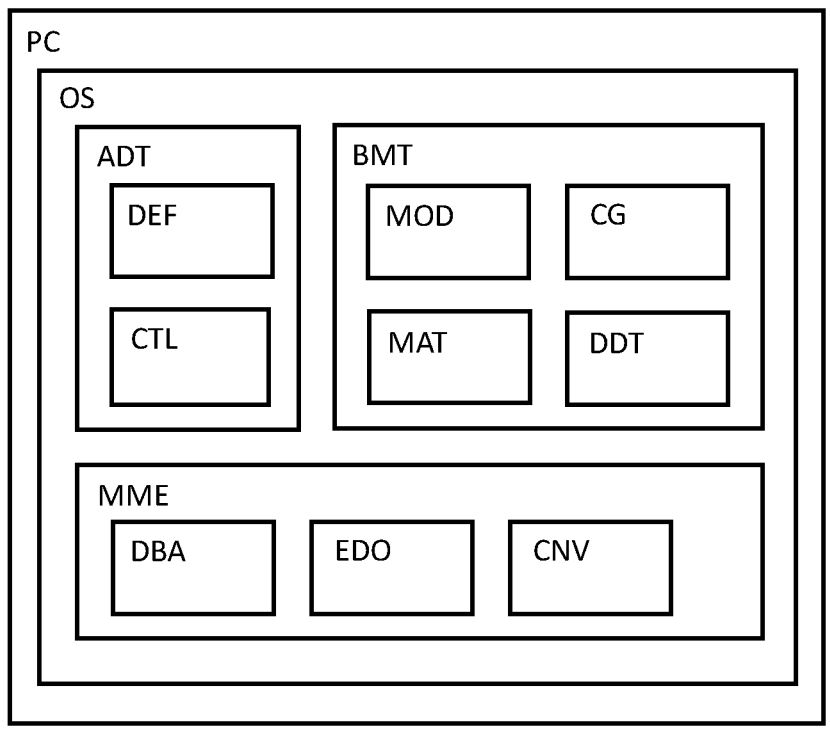
FIG. 2 is an exemplary diagram of software executed on a computer system.

FIG. 2 displays an example of the software being executed on the computer system, which may be realized as a host computer PC with a standard microprocessor that runs a standard operating system OS such as Microsoft Windows or a Linux distribution. On the host computer PC, an architecture definition tool ADI, a behavior-modeling tool BMT and/or a model management environment MME may be installed.

The architecture definition tool ADI comprises a definition environment DEF. The definition environment DEF can comprise a graphical user interface for defining and modifying the software architecture. In addition, it may comprise a user interface for defining a hardware architecture comprising one or multiple ECUs and/or a user interface for deploying different elements of the software architecture on the ECUs of the hardware architecture. Additionally, the architecture definition tool comprises a control tool CTL that allows for importing and/or exporting one or more elements of the software architecture, in particular an entire software component definition. An exemplary architecture definition tool is System Desk of dSPACE.

The behavior-modeling tool BMT may be based on a technical computing environment (such as MATLAB/Simulink of The Math Works) that comprises a plurality of software components such as a modeling environment MOD for modifying block diagrams and/or a script interpreter MAT that is adapted for carrying out calculations or modifying data. Additionally, a simulation engine for executing block diagrams may be part of the BMT. The BMT comprises a code generator CG that is adapted to create code from one or more blocks in the block diagram.

The BMT further comprises a data definition tool DDT that may provide data for a specific block diagram such as definitions and parameters and an application-programming interface for automatic exchange of the data. A data definition tool allows for a clean separation of the model of the dynamic system given in the block diagram from implementation-specific details. By exchanging data with other programs such as the model management environment, the data definition tool DDT can be used as part of a higher-level tool chain, in particular to generate product code compliant to the AUTOSAR standard.

The model management environment MME comprises a database DBA a model editor EDO and one or more converters CNV for exchanging data with other programs such as the architecture definition tool ADT or the behavior modeling tool BMT. The model editor EDO will be described in more detail below. The database DBA may be based on any general-purpose database application, the structure preferably being adapted to manage models and/or test models. The database may comprise a version control or may comprise an interface to a version control system.

For example, it may be specially adapted to manage multiple implementation variants of a model. The model management environment MME may comprise a plurality of dedicated converters adapted to import data from and/or expert data to a specific architecture definition tool or a specific behavior-modeling tool as well as a customizable general-purpose converter using standard format such as XML. Additionally, a converter may be specially adapted to generate structure definitions for a simulated ECU, for example, according to the functional mockup interface (FMI); these may be used in creating virtual electronic control units for simulation purposes.

Other software components such as a production code compiler may be installed on the computer. These software components may be interfaced to each other, the architecture definition tool, the behavior-modeling tool or the model management environment using standard mechanisms of the underlying operating system OS.

Figure 3:
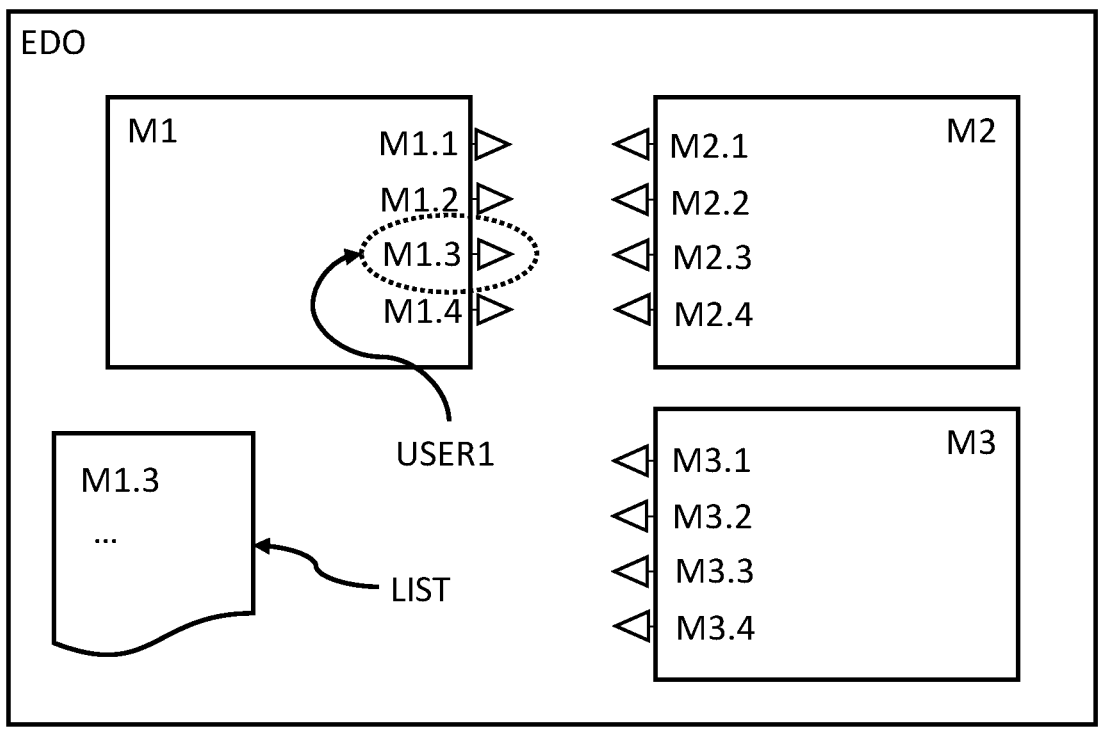
FIG. 3 is an exemplary diagram of the inventive method.

FIG. 3 illustrates an exemplary diagram of a graphical user interface for a model management environment comprising a model editor EDO. The model editor EDO is adapted to view and modify the connections between different model components M1, M2, M3. Model components M1, M2, M3 feature ports with graphical identifiers M1.1, M1.2, M1.3, M1.4, M2.1, M2.2, M2.3, M2.4, M3.1, M3.2, M3.3, M3.4. In the illustrated example, no port connections are implemented, yet. The model editor may receive a user input USER1 to an exemplary port M1.3. The port M1.3 may then be assigned and saved to the list M1.3. At least after assigning the port M1.3 to the list, the list LIST becomes visible and is displayed in the model editor.

Figure 4:
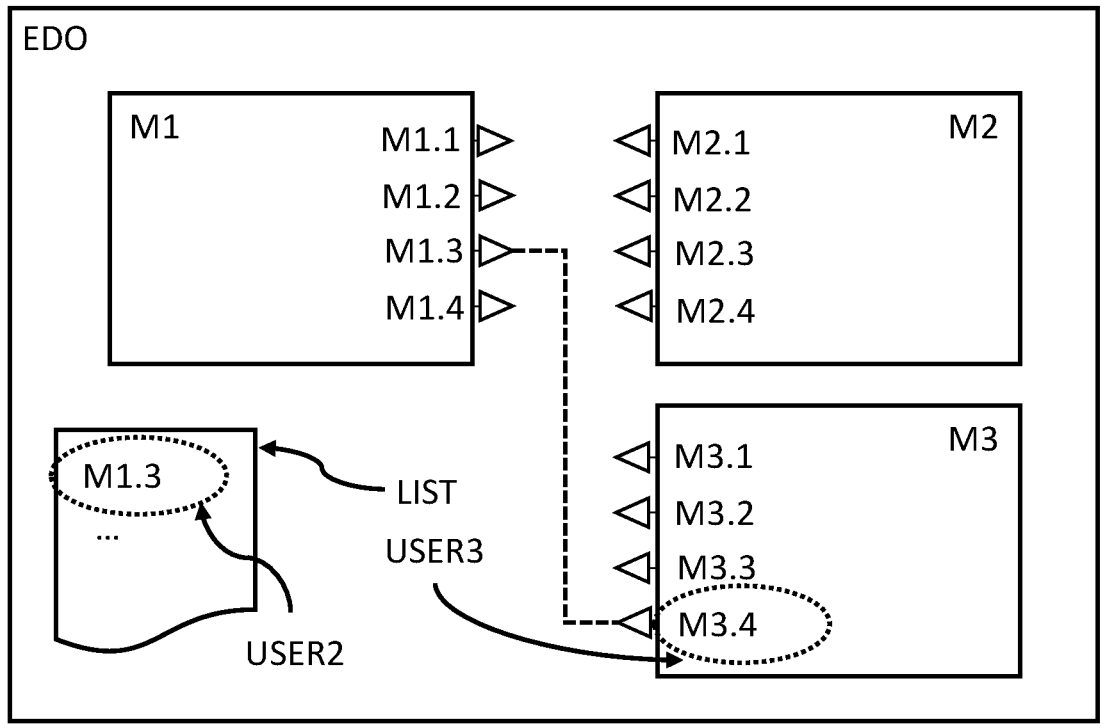
FIG. 4 is another exemplary diagram of the inventive method.

FIG. 4 illustrates another exemplary diagram of a graphical user interface for a model management environment comprising a model editor EDO. The diagram is as described with regard to FIG. 3. Here, another user input USER2 may be received to the modeling environment EDO. The user input USER2 is received to the entry assigned to port M1.3 on the list LIST. Another user input USER3 is received to port M3.4 of model component M3. Then, a connection between ports M1.3 and M3.4 is automatically drawn. The user input USER2 and USER3 may be received in either order.

Figure 5:
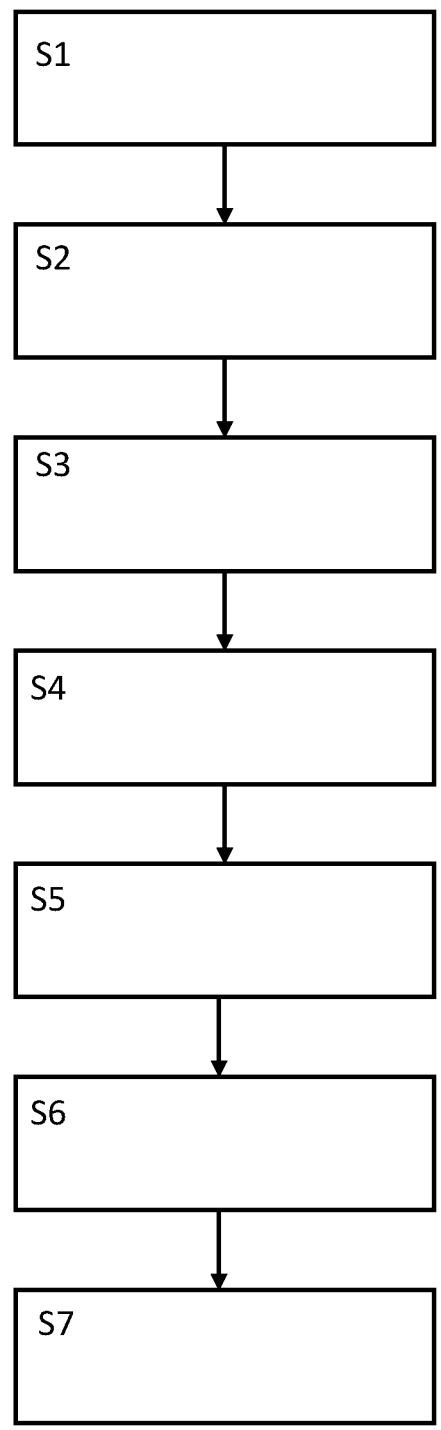
FIG. 5 is an exemplary flow chart of the inventive method.

FIG. 5 illustrates an exemplary flow chart of an embodiment of the invention. In step S1, the system model comprising model components M1, M2, M3 is loaded into the model editor EDO. In step S2, a user input USER1 is received to a first port with a graphical identifier M1.3. The port M1.3 is the assigned to a list LIST in step S3, whereas the list is displayed according to step S4. In step S5 another user input USER2 is received to port M1.3 as listed on list LIST. The user may then in step 6 select a port M3.4 of another model component M3. Finally in step S7, a connection is drawn between the two ports M1.3 and M3.4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for configuring model components of a system model in a model-based test environment comprising a model editor, the test environment being executed on a computer system having a processor and a display, the model components having a plurality of ports, the method comprising:
   loading the system model into the model editor;
   receiving a first user selection for at least a first port of the plurality of ports identifiable by a first graphical port identifier;
   adding the first graphical port identifier of the first port selected by the first user selection to a list;
   displaying the list in the test environment;
   receiving a second user selection for the first graphical port identifier from the list;
   receiving a third user selection for a second port of the plurality of ports; and
   connecting the first port to the second port by a signal connection based on the second user selection and the third user selection.

2. The method of claim 1, wherein the model components comprise at least one of calculation blocks, bus blocks, requirements documents, or software architecture building blocks.

3. The method of claim 1, wherein the receiving the second user selection for the first graphical port identifier from the list and the receiving the third user selection for the second port are performed by dragging and dropping the first graphical port identifier on the list onto the second port or by dragging and dropping a second graphical port identifier of the second port onto the first graphical port identifier on the list.

4. The method of claim 1, where the list is displayed as long as there are entries on the list.

5. The method of claim 4, where the list disappears or becomes at least partially transparent as soon as there are no more entries on the list.

6. The method of claim 1, where the list appears or is displayed non-transparently as soon as the first user selection is made.

7. A computer system comprising at least one host computer, the at least one host computer comprising a processor, a random-access memory, at least one graphics controller connected to a display, a serial interface connected to at least one human interface device, and a nonvolatile memory comprising instructions that, when executed by the processor, cause the host computer to carry out the method according to claim 1.

8. A non-transitory computer-readable medium containing instructions that, when executed by a processor of a computer system, cause the computer system to carry out the method according to claim 1.

\* \* \* \* \*